United States Patent [19]

Cleland

[11] Patent Number: 4,538,636

[45] Date of Patent: Sep. 3, 1985

[54] LIQUID ASPIRATOR WITH IMPROVED ANTI-SYPHON TUBE

[76] Inventor: Robert K. Cleland, 11051 Via El Mercado, Los Alamitos, Calif. 90720

[21] Appl. No.: 605,297

[22] Filed: Apr. 30, 1984

Related U.S. Application Data

[63] Continuation-in-part of Ser. No. 405,424.

[51] Int. Cl.[3] .............................................. F16K 19/00

[52] U.S. Cl. .................................... 137/216; 137/893; 137/897; 239/310; 239/399; 239/589

[58] Field of Search ....................... 137/216, 893, 897; 239/310, 399, 589, DIG. 22, 468, 471; 222/566, 129.2

[56] References Cited

U.S. PATENT DOCUMENTS

| | | | |
|---|---|---|---|
| 1,476,589 | 12/1923 | Brown et al. | 239/399 |
| 2,551,699 | 5/1951 | Parks | 239/468 X |
| 2,625,176 | 1/1953 | Williams et al. | 137/893 |
| 2,815,248 | 12/1957 | O'Brien | 239/468 |
| 3,003,705 | 10/1961 | Johnson | 239/399 |
| 4,218,014 | 8/1980 | Tracy | 222/145 X |
| 4,469,137 | 9/1984 | Cleland | 137/893 |

FOREIGN PATENT DOCUMENTS

| | | | |
|---|---|---|---|
| 1183611 | 7/1959 | France | 239/468 |

*Primary Examiner*—Martin P. Schwadron
*Assistant Examiner*—Stephen M. Hepperle
*Attorney, Agent, or Firm*—Georges A. Maxwell

[57] ABSTRACT

An aspirator structure to proportionately mix a pressurized motive liquid and non-pressurized additive liquid and to deliver the mixed liquids into a storage supply of mixed liquids. The aspirator structure includes an elongate aspirating chamber connected with the supplies of motive and additive liquids and has a discharge end from which the mixed liquids flow. The structure next includes an elongate, vertical delivery tube with a cylindrical inside surface, a closed upper end portion communicating with the discharge end of the chamber and an open lower end opening in the supply of mixed liquids. The cross-sectional extent of the tube is greater than the cross-sectional extent of the chamber and the liquids flowing from the chamber are directed substantially tangentially with respect to the inside surface of the tube so that those liquids establish a vortex flow with and are moved downwardly therethrough by the force of gravity. The tube has an elongate radially opening circumferentially and longitudinally extending anti-syphon slot opening pitch counter to the vortex flow of liquids whereby those liquids flow substantially laterally across the opening within the tube.

5 Claims, 10 Drawing Figures

LIQUID ASPIRATOR WITH IMPROVED ANTI-SYPHON TUBE

This is a continuation in part of my copending application Ser. No. 405,424, U.S. Pat. No. 4,469,137, filed 8/5/82, entitled "IMPROVED LIQUID METERING AMD MIXING ASPIRATOR UNIT".

This invention has to do with an improved liquid mixing aspirator with an improved anti-syphon delivery tube.

BACKGROUND OF THE INVENTION

Throughout the arts there are many instances where two liquids must be proportionally combined and/or mixed. Still further, in many such instances, one of the liquids is provided or supplied in a non-pressurized or pressure neutral condition and the other liquid is supplied under pressure. In such instances, aspirators are commonly employed to proportionally combine and/or mix the two liquids. The liquids supplied under pressure are utilized as motive liquids and when conducted through the aspirators, draw the pressure neutral liquids into the aspirators to combine with the motive liquids flowing therethrough.

The ordinary aspirator suitable for proportionally combining pressure material and pressurized liquids is characterized by a structure defining an elongate aspirating chamber with an open end and a closed end, a high pressure nozzle passage of reduced diameter, concentric with and opening at the closed end of the aspirating chamber and connected with a supply of motive liquid and a low pressure inlet port communicating with the mixing chamber between the ends thereof and connected with the supply of pressure neutral liquid. The nozzle passage directs a high velocity stream or jet of motive fluid longitudinally through and from the open end of the aspirating chamber.

The jet of motive liquid establishes a minus pressure in the aspirating chamber. That minus pressure draws the pressure neutral liquid into the chamber, through the port to combine with the motive liquid.

The effectiveness and/or efficiency of aspirators of the general character referred to above varies greatly. The construction of such aspirators is extremely simple and easy to make and their design and resulting efficiency, is generally arrived at by empirical methods of making, adjusting and testing some basic aspirator structures until a satisfactory result is attained.

As a general rule, where aspirators of the character referred to above are used, the outlet end of the aspirating chambers open into large diameter liquid conducting containers which are such that no adverse restriction of flow and/or back pressures are created downstream of the aspirating chambers. That is, the liquids are "dumped" free from the aspirators.

One special type or class of machine in which proportional mixing liquid aspirators are widely used are those beverage dispensing machines which are characterized by large upwardly opening beverage supply tanks in which beverages established of proportionally mixed water and liquid beverage concentrates are stored and from which the beverages are dispensed. For merchandising and aesthetic purposes, the supply tanks of such machines are transparent and such that the beverage can be temptingly viewed by viewed by perspective purchasers. Such tanks are generally and preferably kept at least threequarters full and the beverages are caused to circulate to keep their ingredients well mixed and to enhance the aesthetics thereof.

In such beverage dispensing machines, the aspirators are operated intermittently to maintain the beverage in the tanks at desired levels. The high pressure nozzle passages of the aspirators of such machines are suitably connected with pressurized municipal water supply systems or the like and the low pressure inlet ports are suitably connected with pressure neutral supplies of liquid beverage concentrates adjacent to or remote from the aspirators and/or the beverage supply tanks.

In machines of the character referred to above, it has been clearly established that the aspirators are most conveniently and effectively carried by covers for and overlying the open tops of the supply tanks so that the beverage mixed therein and dispensed thereby simply pours or dumps downwardly into the tanks to combine with the existing supply of beverage therein. Another reason for locating the aspirators at the tops of the supply tanks resides in the fact that the aspirators must be above the liquid level in the tanks or otherwise isolated therefrom so that when the aspirators are not in operation, the possibility or likelihood of the aspirators functioning to syphon beverage from the tanks and back into the concentrate and/or water supplies is avoided.

Further, in such beverage dispensing machines, the mixed concentrates and water are often such that if freely dispensed from the aspirators into the tanks, above the beverage levels in the tanks, the liquids splash about in an unsightly and undesirable manner, generating undesirable noise and often creating heads of foam on the beverage in the tank which are not only unsightly but which tend to leak or flood from the tops of the tanks and create objectionable clean-up and maintenance problems.

As a result of the foregoing, the prior art have provided aspirators with vertical delivery tubes with upper ends communicating with the outlets of the aspirating chambers of the aspirators and which depend into and open within the volume of beverage in the supply tanks. Such delivery tubes prevent splashing, reduce undesirable noise and substantially eliminate the generating of foam or the like. However, in order to prevent back syphoning the liquid beverage through the delivery tubes and their related aspirators, the delivery tubes must be provided with anti-syphon vents or ports in the sides thereof, above the liquid level in the supply tanks. If such ports are made too small, they tend to become plugged and/or stopped up by the syrupy and oftentimes fruit pulp ladened beverage concentrates and are rendered ineffective. If such vent openings are made sufficiently large so that they will not become plugged or fouled, they are, as a general rule, so large that they afford less resistance to the flow of beverage through them than is afforded by the portions of the tube below them and the beverages tend to flow out through the vent ports and create all of those problems and adverse effects the delivery tubes are intended to eliminate.

OBJECTS AND FEATURES OF THE INVENTION

It is an object of my invention to provide a liquid mixing aspirator for beverage dispensing machines or the like which includes an elongate horizontal aspirating chamber of limited effective cross-sectional extent and a novel and improved elongate vertical delivery tube of greater effective cross-sectional extent than the aspirating chamber communicating with the outlet end of the aspirating chamber and depending therefrom into a volume of liquid below the aspirator and to which the liquid delivered by the aspirator is to be added.

Another object and feature of my invention is to provide an aspirator with elongate, vertical delivery tube of the general character referred to above which has an elongate, longitudinally and circumferentially extending radially inwardly and outwardly opening anti-syphon vent slot between its ends, which slot is sufficiently wide so that it is not subject to becoming fouled and/or plugged by the material flowing downwardly in and through the tube.

Yet another object and feature of the invention is to provide a delivery tube of the character referred to above wherein the vent slot has flat, opposing, opposite side surfaces which converge with the inside surfaces of the tube to define sharp, clean corner edges which are longitudinally and circumferentially inclined or angularly disposed relative to the longitudinal axis of the tube whereby said corner edges are at acute angle to the flow of liquid within the tube so that the liquid is freely released at or by said corner edges and moves across the slot to inhibit the flow of liquid radially outwardly through the slot.

It is another object and feature of my invention to provide an elongate, vertical delivery tube for an aspirator of the general character referred to above wherein the inside of the tube is cylindrical and is tapered longitudinally downwardly and inwardly to cause the liquid flowing down through it to establish and/or maintain a vortex flow therein and to establish a minus pressure in the upper central portion of the tube which enhances the efficiency of the aspirator.

Another object and feature is to provide a structure of the character referred to wherein the outlet of the aspirating chamber is tangential with the cylindrical interior of the tube and so that liquids flowing from that chamber into that tube are caused to establish a vortex flow in the tube.

Finally, it is an object and feature of my invention to provide a structure of the character referred to wherein the slot vent opening is helically pitch counter to the helically pitch vortex flow of fluids in the tube wherein the liquids flow across the width of the slot within the tube.

The foregoing and other objects and features of my invention will be apparent and fully understood from the following detailed description of the invention, throughout which description reference is made to the accompanying drawings.

DESCRIPTION OF THE DRAWINGS

FIGS. 7 and 8 are enlarged views of portions of the tube structure;

DETAILED DESCRIPTION OF THE INVENTION

Figure 1:
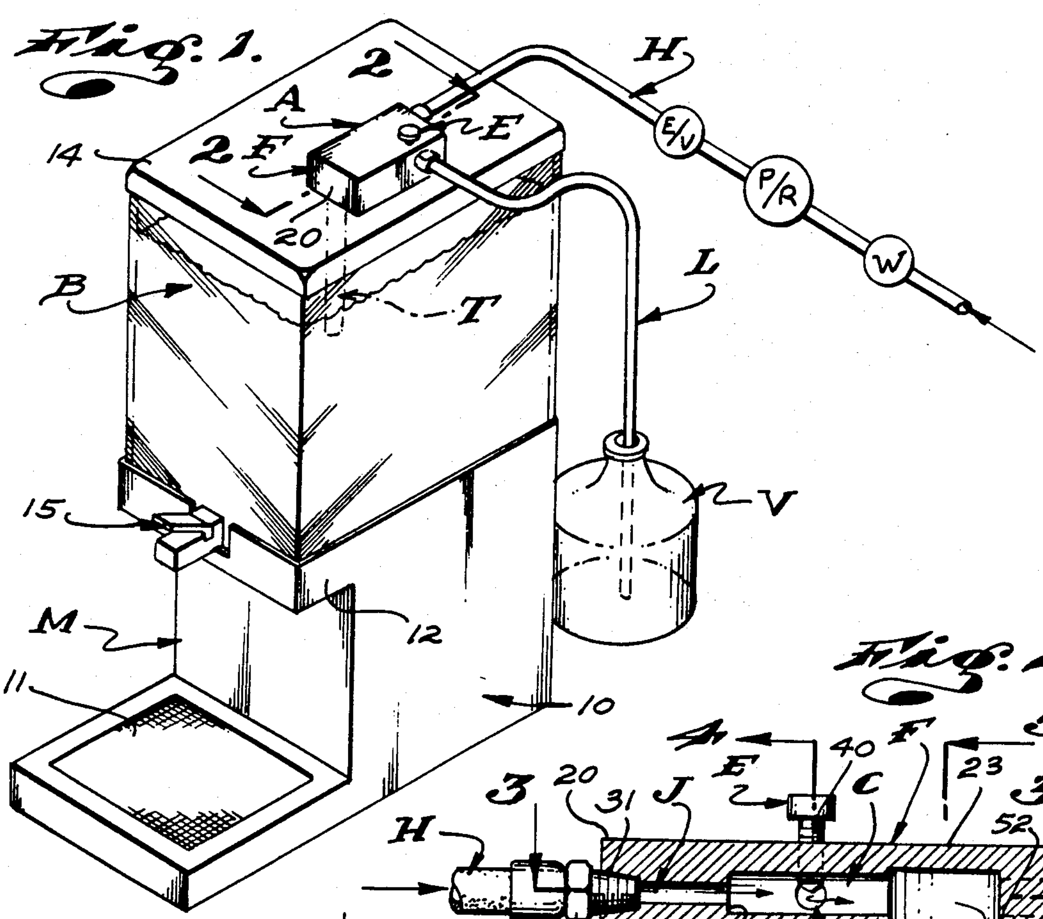
FIG. 1 is an isometric view of a typical beverage dispensing machine with my invention related to it.
Figure 2:
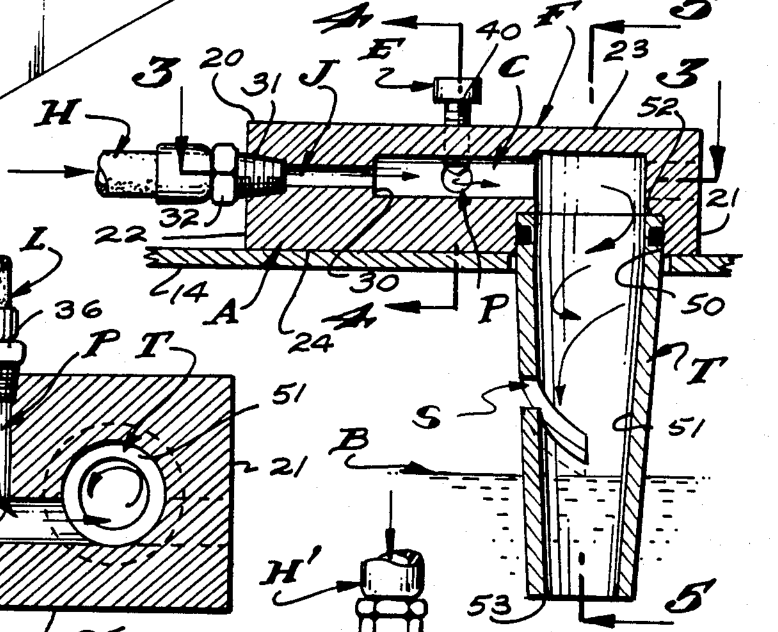
FIG. 2 is an enlarged sectional view of a portion of the structure shown in FIG. 1 and taken substantially as indicated by line 2—2 on FIG. 1.
Figure 3:
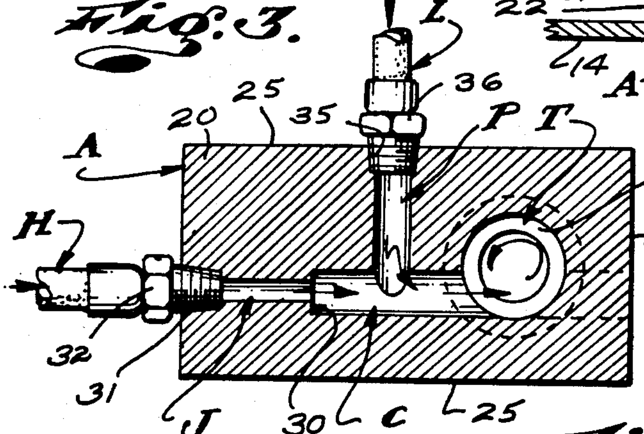
FIG. 3 is a sectional view taken substantially as indicated by line 3—3 on FIG. 2.

Referring to FIG. 1 of the drawings, I have shown a typical beverage dispensing machine M. The machine M includes a vertical counter top engaging base 10 with a lower glass supporting tray portion 11 and an upper tank supporting head portion 12. An elongate, vertical upwardly opening tank 13 is supported by and projects up from the head 12 of the base 10 and is provided with a substantially flat, horizontal removable cover 14. The tank 13 is provided with a dispensing valve 15 at its lower forward portion, above the tray portion 11. The tank 13 is made of transparent plastic material whereby a volume of liquid beverage B within the tank can be observed.

In practice, such beverage dispensing machines include refrigeration units to maintain the beverage in the tanks cool and include fluid pumping means or the like to keep the beverage mixed and in effective circulation. In some machines of the character here concerned with, various automatic filling means and/or devices are provided to keep the supply of beverage in the tank between predetermined high and low levels. Such automatic filling means commonly include aspirators connected with pressurized water supplies and with liquid beverage concentrate supplies and are caused to operate intermittently by means of electrically operated valves in the water supply, which valves are under control of liquid level sensing means within the beverage tanks.

The design and details of construction of beverage dispensing machines of the character here concerned with which are produced by different manufacturers vary widely, but most of those differences which are to be found are such that they would have little or no effect on my present invention.

In FIG. 1 of the drawings, I have shown automatic filler means F for the machine M. The means F illustrated is a rather simple or basic form of filler means and includes an aspirator A carried by the tank cover 14. The aspirator A is shown connected with a suitable water supply valve W of a pressurized water service system by means of a water supply hose H and is connected with a vessel V of liquid beverage concentrate by means of a suitable suction line L.

The valve W can be employed to control the flow rate and volume of water delivered to the aspirator A or a pressure regulator P/R can, as shown, be engaged in the hose H to serve the same end. In addition to the above, an electrically operated on and off valve E/V can be engaged in the hose H to start and stop the flow of water therethrough. The valve E/V can be manually operated or can be controlled by any one of a number of different forms of liquid level sensing means (not shown) related to the tank 13. For example, the valve E/V can be controlled by a simple float valve disposed within the tank 13 and engaged in a power line delivering current to the valve E/V.

Finally, the aspirator A is provided with a delivery tube T. The delivery tube T connects with the outlet of the aspirator A and depends into the tank 13 and into the beverage B therein. That is, the tube T has a lower open end which occurs below the normal low liquid level of the beverage in the tank 13.

In practice, the means F can include a concentrate metering valve means E which can be built into or arranged within the aspirator structure, in the suction line L or at the container C, as desired or as circumstances require. In the case illustrated, the valve E is incorporated in the aspirator A.

In practice, and in the absence of a metering valve for the concentrate, flow of concentrate might be controlled by varying the elevation of the container C relative to the aspirator A.

The present invention relates to and is to be found in the nature and form of the delivery tube T that I provide and the relationship of that tube with the outlet of the aspirator A.

Figure 10:
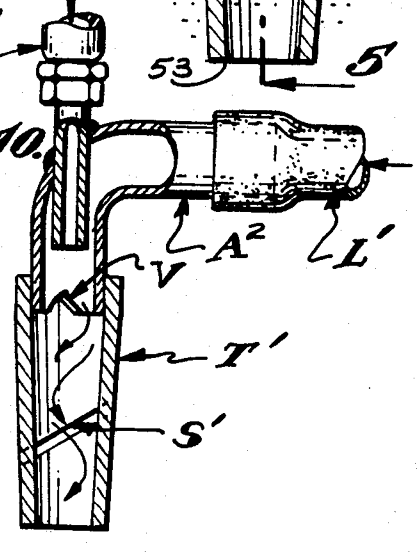
FIG. 10 is a sectional view of yet another embodiment of the invention.
Figure 4:
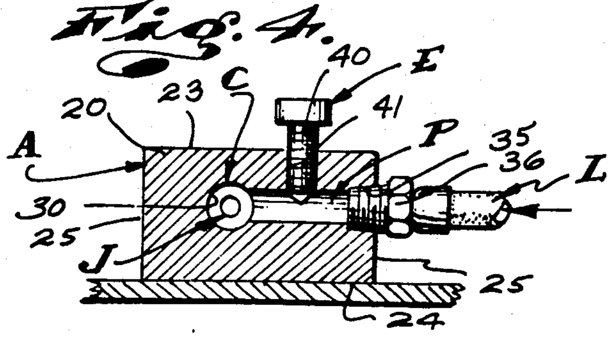
FIG. 4 is a sectional view taken substantially as indicated by line 4—4 on FIG. 2.

In practice, the aspirator can vary widely in details of construction. For example, and as shown in FIG. 10 of the drawings, the aspirator A′ can be fabricated of metal tube stock and connected with a water supply hose H′, concentrate suction line L′, and with my new delivery tube T′, substantially as shown. In the preferred carrying out of my invention, the aspirator is established of a block of suitable plastic material suitably drilled, tapped, plugged and otherwise worked upon to establish the various parts, portions, chambers and openings required. Further, while the aspirator can be a vertical unit providing for straight through flow of water, as shown at $A^2$ in FIG. 9 of the drawings, I prefer to employ that block type aspirator unit A shown in FIGS. 1 through 5 of the drawings, which includes a vortex-mixing chamber 0 to receive the combined liquids flowing into, through and from the aspirator, and which will be described in greater detail in the following.

The aspirator A includes a simple, elongate, horizontal, block-like body 20 with substantially flat, vertical front and rear ends or surfaces 21 and 22, substantially flat, horizontal top and bottom sides or surfaces 23 and 24 and substantially flat, vertical opposite sides or side surfaces 25.

The body 20 is formed with an elongate large diameter, vertically extending and downwardly opening cylindrical vortex-mixing chamber O entering its bottom surface at the front end portion thereof. The chamber O is established as by a suitable drilling operation.

The body 20 next includes an elongate, horizontal, cylindrical aspirating chamber C with a forwardly disposed front discharge end opening substantially tangential with and into the upper portion of the chamber O and extending rearwardly in the body from the chamber O and terminating at a flat, closed bottom or rear end 30. (The aspirating chamber is drilled into the body from the front end thereof. The opening in the body 20, forward of the chamber O established when drilling the aspirating chamber C, is suitably plugged).

The body 20 is next formed with a small diameter nozzle passage J aligned with and extending rearwardly from the bottom 30 of the chamber C. The passage J, like the chambers O and C, is established by a suitable drilling operation.

The body 20 is next formed with coupling means 31 at its rear end to couple or connect the rear inlet end of the nozzle passage J with the downstream end of the water supply hose H. The means 31 is shown as a tapped opening entering the rear end of the body concentric with the passage J and in which a hose coupling part 32 on the hose H is engaged.

The body 20 next includes an elongate concentrate inlet port P with an inlet end communicating with the aspirating chamber C between the ends thereof and an outlet end accessible at a side of the body 20. The outlet end of the port P communicates with a tapped opening 35 entering the side of the body 20 and in which a hose-coupling part 36 at the downstream or outlet end of the suction line L is engaged.

The port P and opening 35 are established in the block-like body by suitable drilling and tapping operations.

In the form of the invention illustrated and now being described, the above noted concentrate metering valve means is established in the body 20 and includes an elongate needle valve member 40 engaged in a drilled and tapped or threaded opening 41 entering the top of the body and communicating with the port P between the ends thereof. The valve member 40 has a lower tapered end shiftable vertically into and out of throttling engagement in the port P and, as shown, can be provided with a manually engageable head at its upper end, accessible at the exterior of the body to facilitate turning the member and advancing or retracting the lower end thereof into and out of engagement in the port P.

Finally, in the preferred carrying out of my invention, and as shown, the lower open end of the vortex-mixing chamber O is formed with annular radially inwardly and axially downwardly opening annular seat 50 in which the upper end portion of the delivery tube T is engaged.

But for the vortex-mixing chamber O and the relationship of that chamber with the forward outlet or discharge end of the mixing chamber C, the aspirator A illustrated and described above is a typical aspirator structure, the design, proportioning and detail of construction of which can be varied widely without departing from the broader aspects and spirit of my invention.

While the noted vortex-mixing chamber O and its special relationship with the forward outlet end of the mixing chamber C is unique and is important in the most effective and preferred carrying out of my invention, it is not indispensable and can be eliminated without material adverse effects. Accordingly, in accordance with the broader aspects of my invention, the aspirator A can be in or take the form of those aspirators A′ and $A^2$ shown in FIGS. 9 and 10 of the drawings.

It is to be noted that in practice, the electrically operated on and off valve E/V, shown engaged in the hose H in FIG. 1 of the drawings, can, in practice, be built into and carried by the body 20 of the aspirator. It is shown separate from the body 20 of the aspirator and engaged in the hose H for purposes of convenience and so as not to unnecessarily complicate this disclosure.

The delivery tube T is an elongate, tubular, preferably cylindrical part or member with a cylindrical inside bore or surface 51, open upper and lower ends 52 and 53 and is characterized by an elongate, axially and circumferentially extending radially inwardly and outwardly opening vent slot S.

The open upper end portion of the tube is engaged in and held in the annular seat 50 in the bottom of the aspirator body about the lower open end of the vortex-mixing chamber O whereby the upper open end of the tube is in full communication with the chamber O. In the form of the invention illustrated, the inside diameters of the chamber O and the top of the tube T are the same. The tube T depends from the body 20 and is of sufficient length or vertical extent so that it depends into the tank of its related dispensing machine M a sufficient distance so that its lower end portion extends into the supply of liquid beverage B in the tank.

Figure 5:
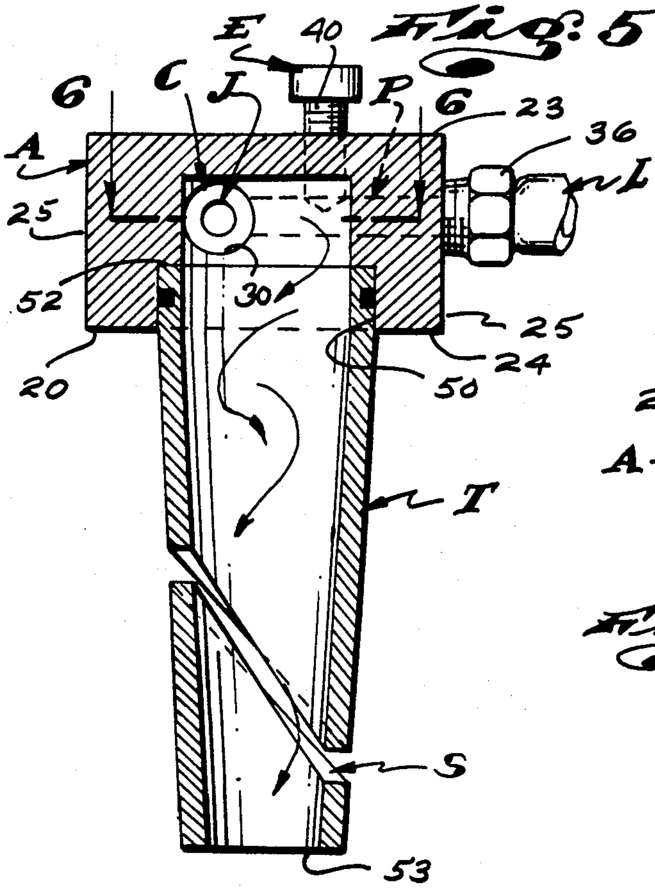
FIG. 5 is an enlarged sectional view taken substantially as indicated by line 5—5 on FIG. 2.
Figure 6:
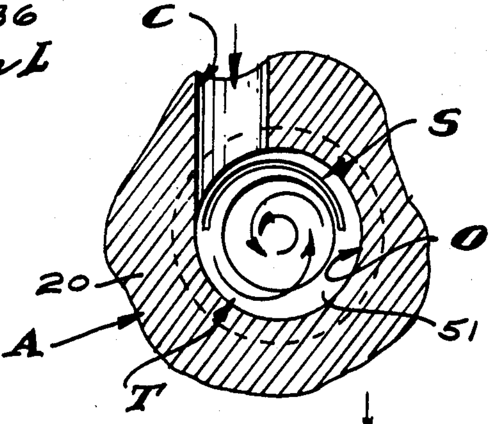
FIG. 6 is a view taken substantially as indicated by line 6—6 on FIG. 5.

In practice, the tube T is frictionally releasably engaged and held in the seat 50 in the body 20. This relationship of parts can be assured and assisted by means of an O-ring in interfering fit between the seat 50 and an annular groove formed in the tube and in which the O-ring is engaged as best shown in FIG. 5 of the drawings.

The vent slot S is formed in the tube between the ends thereof so that at least a substantial portion thereof occurs above the liquid level in the tank T at all times. That is, while the vent slot S can be such that it occurs wholly above the liquid level in the tank, such a relationship is not critical and the lower end portion of the slot can extend down and into liquid in the tank without adverse effects.

The forward outlet end of the aspirator chamber is preferably tangential with or laterally offset toward one side of the vortex chamber O so that the liquids issuing from the chamber C and into the chamber O are caused to establish strong and certain counterclockwise vortex flow within the chamber O and thence in the tube T, as the moving and advancing liquids are caused to drop and flow downwardly therethrough by the force of gravity.

The vent slot S extends clockwise downwardly and circumferentially of the tube at an angle which, in theory, is preferably normal, close to normal or at an acute angle relative to the direction of the downwardly and circumferentially flowing liquids in the tube at and across the inner open side of the slot. With such a relationship of the slot and flowing liquid, the liquid flows across the narrow width of the tube, rather than longitudinally along the major longitudinal extent thereof.

It will be apparent that with the above noted relationship of parts, the moving liquid in the tube, the velocity of which is substantial, tends to continue or remain in its established flow course within the tube and bridges or passes across the inner open side of the slot S. This function and/or effect is sufficiently strong and great so that the slot S can be of substantial lateral extent and width and can be made so large that it cannot be plugged up and/ or fouled by any viscuous, pulpy and/or fibrous material likely to be encountered in the establishing of beverages by the mixing of water and liquid beverage concentrates.

In one preferred carrying out of my invention, the tube T is $\frac{1}{2}$" in inside diameter at its top, $\frac{7}{8}$" in inside diameter at the bottom, 4 $\frac{1}{2}$" long and the vent slot is $\frac{1}{8}$" wide and about $\frac{3}{4}$" long. The slot S is disposed at an angle of about 45° relative to the longitudinal axis of the tube. The slot S is established in the tube by a straight 45° saw cut through one half (180° ) of the tube. Thus, it will be apparent that the slot S is dimensionally extensive and provides great open area.

It is notable that in spite of the great extent of the vent slot S, no appreciable liquid flowing down and about the interior of the tube T escapes from or flows radially outward through the slot S in the tube when the aspirator is operating. That little fluid which might enter the slot is directed down and longitudinally of the slot, by the sides thereof, and cannot be seen to leave the tube in a manner to cause any adverse effects.

In furtherance of my invention, the tube T (at least the inside bore thereof) is preferably tapered downwardly and longitudinally inwardly at an angle which is such that vortex flow of liquid flowing down through it is induced, accelerated or sustained. In practice, taper angles of from 1° to 5° have been provided and proven to be highly effective to establish and accelerate or maintain desired vortex flow of liquid flowing downwardly in and through the tube. For the purpose of illustration, the taper angle of the tube is exaggerated and shown at about 6°.

Tapering of the tube T in the manner illustrated and described above must be such that the effective minor inside diameter of the tube, at its lower end, is not reduced to an extent that the free gravity flow of the full volume of liquid moving longitudinally downwardly through and from the tube is throttled down or choked off to an extent or degree which is less than the full volume of liquid flowing through and from the aspirating of the aspirator A. If the tube is such that it chokes off or throttles down the volume of liquid flowing through the tube to less than the volume of liquid delivered into the tube by the aspirator, a back pressure is established at the aspirator which adversely affects its efficiency. Further, in such a situation the liquid in the tube is caused to back up and to escape radially outwardly through the slot S.

Emperical testing has clearly established that the tube T, when properly designed and functioning as intended, works to greatly enhance and increase the effectiveness and efficiency of its related aspirator. For example, test results have clearly established that an aspirator, such as is shown in the drawings, which is not provided with the tube T and which is effective to draw minus pressures of 8 to 10 inches of mercury at the port P, will draw minus pressures of in excess of 20 inches of mercury when the tube T is related to it. As presently understood and believed by applicant, the extraordinary and notable increase in efficiency of the aspirator A, afforded by the tube T, is attributable to the fact that the elongate, vertical, depending tube T serves as an enlarged extension of the aspirating chamber C (and intermediate chamber O) in which the liquids flowing from the chamber C are contained in such a manner that the motive energy in the motive liquid is allowed or given the opportunity to be fully used and/or expended. Additionally, the force of gravity acting on the liquid in the tube is put to use to advance the liquid downwardly in the tube T from the chamber C, thus supplementing the work force afforded by the motive liquid. It appears and is further understood and believed that the vortex flow of liquid advancing in and downwardly through the tube T works to establish a reduced pressure at and within the upper central portion of the tube T and within the vortex chamber O and therefore at the outlet end of the chamber C which reduced pressure scavenges the liquids in and flowing from the mixing chamber and supplements and notably increases the effectiveness and efficiency of the aspirator.

The above reasons and/or explanations of how and/or why my elongate, vertical, downwardly tapered delivery tube T notably increases the effectiveness and efficiency of its related aspirator A might or might not be complete and/or technically correct and were arrived at from observation and emperical testing of various kinds and forms of aspirators and delivery tubes prior to, during and subsequent to conception and reduction to practice of my invention. Accordingly, the reasons and or explanations of how and/or why my invention functions as set forth above can be accepted or rejected as the reader desired.

It is important to note that the function of my delivery tube to effect a notable increase in the effectiveness and efficiency of its related aspirator works well when the tube T is not provided with or does not include the above noted and illustrated vent slot S. Accordingly, the broader aspects of my invention include that subcombination of an aspirator and an elongate vertical downwardly tapered delivery tube which is not provided with a vent opening or slot.

Figure 9:
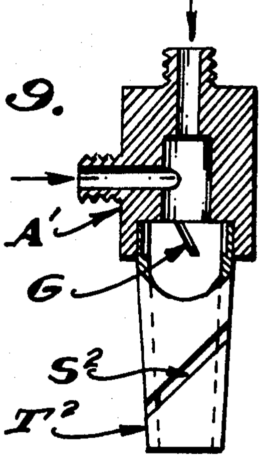
FIG. 9 is a view of another embodiment of my invention.
Figure 2:
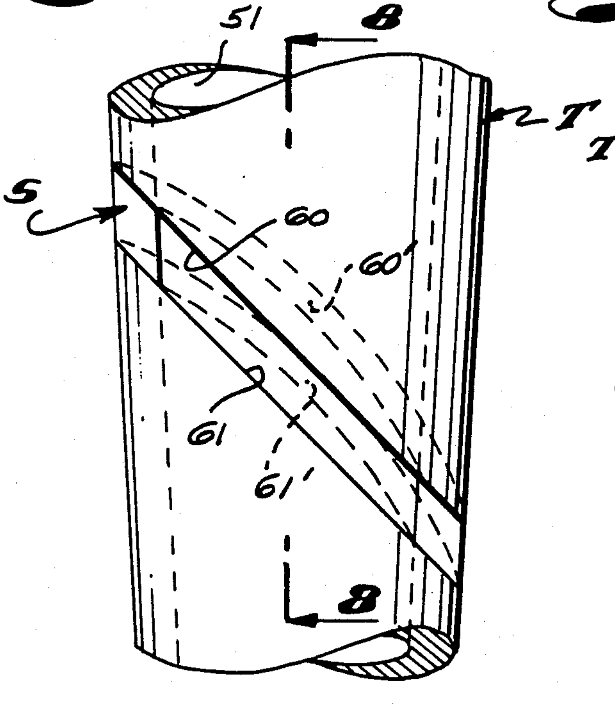

It is to be noted that in the case of aspirator structures such as are shown in FIGS. 9 and 10 of the drawings, wherein the vertical delivery tubes are aligned with the downwardly opening outlet ends of their related vertical aspirating chambers, the liquids entering the tops of the tubes and caused to flow downwardly therethrough, by gravity, tend to naturally establish vortex flow within the tube naturally. The vent slots in the tubes function as they do in the first described form of the invention. The natural establishing of vortex flow is not sufficiently sure and is not sufficiently fast to develop for practical use, accordingly, in those forms of my invention shown in FIGS. 9 and 10 of the drawings, vortex flow of liquid in and through the tubes can be and is preferably started by suitable flow directing means such as suitably pitched and/or inclined flow directing vanes V or grooves G positioned or formed in the discharge end portions of the aspirating chambers or in the upper inlet ends of the tubes and as shown in FIGS. 9 and 10 of the drawings. Vanes V and grooves G serve to attain the same end as the aspirating and vortex chambers C and O in the first described form of the invention.

Figure 8:
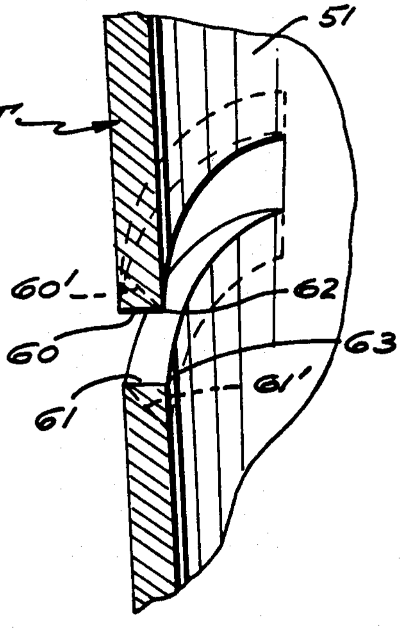

In furtherance of the above and as best shown in FIGS. 7 and 8 of the drawings, the vent slot S has flat, smooth, upper and lower side surfaces 60 and 61 which converge with the cylindrical inside surface of the delivery tube T to establish sharp, clean, right angle upper and lower corners edges 62 and 63. The upper corner edge 62 is such that the liquid flowing down through the tube and laterally across the slot S is released by and freely parts from the corner 62 and is not subject to being drawn around the corner and out into the slot S by capillary attraction or surface tension.

In practice, if desired, the slot S can be cut or otherwise established so that the upper and lower side surfaces 60′ and 61′ are downwardly and radially inwardly inclined and so that the upper corner edge 62 is an acute angle corner edge and the lower corner edge 63 is an obtuse corner edge, as shown in dotted lines in FIGS. 7 and 8 of the drawings. With such sides and corner edges, it will be apparent that the tendency or possibility of the flow of liquid in the tube being interfered with by the vent slot is greatly reduced.

Finally, it will be noted that when the aspirator A is not operating, the vent slot provides extensive communication between the interior or the tube T and the ambient atmosphere in the tank T of the vending machine M, above the liquid therein and that syphoning of liquid from the tank, up through the tube T and thence back through the aspirator A, is prevented.

Having described only typical preferred forms and applications of my invention, I do not wish to be limited to the specific details herein set forth but wish to reserve to myself any modifications and/or variations that might appear to those skilled in the art and which fall within the scope of the following claims.

Having described my invention, I claim:

1. An aspirator to combine a motive liquid under pressure and an additive liquid from a non-pressurized supply of additive liquid, said aspirator comprising structure defining an elongate aspirating chamber with an open front end and a closed rear end, an elongate nozzle passage smaller in cross-section than the chamber with a forward discharge end aligned with an opening at the rear end of the chamber and a rear end connected with a supply of motive liquid under pressure, an elongate inlet port with an inner end communicating with the chamber between the ends thereof and an outlet end connected with a supply of additive liquid, said nozzle passage directs a jet of motive liquid forwardly through and from the chamber, said jet establishes a minus pressure in the chamber, said minus pressure draws additive liquid through the port into and forwardly through the chamber with said motive liquid, an elongate vertical delivery tube greater in cross-section than the chamber with an upper end communicating with the front end of the chamber, said tube has a downwardly and radially inwardly tapered cylindrical inside surface and a downwardly opening lower end and in which the force of gravity and the residual work energy in the motive liquid downstream of the chamber work to advance the liquids issuing from the chamber downwardly through and from the tube in advance of the liquids issuing from the chamber, the tapered inside surface of the tube causes the flow of liquids downwardly therein to establish a vortex flow and said vortex flow establishes a minus pressure centrally and within the upper portion of the tube downstream of the front end of the chamber which induces the free flow of liquids in and from the chamber, the lower end portion of the tube extends into and opens within a volume of liquid within a liquid containing structure to which the liquids delivered from the aspirator are added, said tube is formed with an elongate vertically and circumferentially extending radially inwardly and outwardly opening anti-syphon vent slot communicating with the interior of the tube and with the atmosphere outside of said tube above said volume of liquid.

2. The aspirator set forth in claim 1 wherein the vent slot has laterally spaced opposing upper and lower sides on substantially parallel planes and is inclined vertically and circumferentially in a direction counter to the vertical and circumferential vortex flow of liquid in the tube so that the liquids in the tube move across the slot between the planes of the sides thereof as the liquids advance downwardly through the tube.

3. The aspirator set forth in claim 1 which further includes liquid flow directing means at the front end of the chamber and upper end of the tube directing the liquids flowing from the chamber into the tube to flow circumferentially and induce said vortex flow within the tube.

4. The aspirator set forth in claim 1 which further includes liquid flow directing means at the front end of the chamber and upper end of the tube directing the liquids flowing from the chamber into the tube to flow circumferentially and induce said vortex flow within the tube, the anti-syphon vent slot has laterally spaced opposing upper and lower sides on substantially parallel planes and is inclined vertically and circumferentially in a direction counter to the vertical and circumferential vortex flow of liquid in the tube so that the liquids in the tube move across the slot between the planes of the sides thereof as the liquids advance downwardly through the tube.

5. The aspirator set forth in claim 1 wherein the anti-syphon vent slot has laterally spaced opposing upper and lower side surfaces on substantially parallel planes and is inclined vertically and circumferentially in a direction counter to the vertical and circumferential vortex flow of liquids in the tube whereby the liquids in the tube move across the slot between the planes of the said side surfaces thereof as the liquid moves downwardly through the tube, the planes of said upper and lower side surfaces are downwardly and radially inwardly inclined and converge with said inside surface of the tube at acute and obtuse angles, respectively.

* * * * *